US006985673B2

(12) United States Patent
Molldrem, Jr.

(10) Patent No.: US 6,985,673 B2
(45) Date of Patent: Jan. 10, 2006

(54) AUTOMATED FILM PROCESSING KIOSK SYSTEM

(76) Inventor: Bernhard P. Molldrem, Jr., 320 Highland Ave., Syracuse, NY (US) 13203

( * ) Notice: Subject to any disclaimer, the term of this patent is extended or adjusted under 35 U.S.C. 154(b) by 79 days.

(21) Appl. No.: 10/652,966

(22) Filed: Sep. 2, 2003

(65) Prior Publication Data

US 2005/0047777 A1 Mar. 3, 2005

(51) Int. Cl.
*G03B 15/00* (2006.01)
*G03D 17/00* (2006.01)

(52) U.S. Cl. .............................. 396/2; 396/6; 396/599; 355/27; 355/40; 705/26

(58) Field of Classification Search ..................... None

See application file for complete search history.

(56) References Cited

U.S. PATENT DOCUMENTS

| | | | | |
|---|---|---|---|---|
| 5,113,351 A | * | 5/1992 | Bostic | 396/564 |
| 5,808,723 A | * | 9/1998 | Klees | 355/40 |
| 6,045,078 A | * | 4/2000 | Zander | 396/512 |
| 6,282,373 B1 | * | 8/2001 | Glogovsky et al. | 396/2 |
| 6,346,998 B2 | | 2/2002 | Shiota et al. | 358/487 |
| 6,461,061 B2 | | 10/2002 | Corbin et al. | 396/567 |
| 6,480,673 B2 | * | 11/2002 | Liebenow | 396/2 |
| 6,554,504 B2 | | 4/2003 | Cook et al. | 396/567 |
| 2002/0105665 A1 | * | 8/2002 | Wasilewski et al. | 358/1.13 |
| 2003/0049032 A1 | * | 3/2003 | Bauer | 396/564 |

OTHER PUBLICATIONS

USA Technologies Case Study, Kodak Products Vending System, Networked vs. Traditional Vending Systems, 2003.
Garry Barker, Developing Story of Picture Processing, The Age, Mar. 25, 2003.
Applied Science Fiction, DigiPIX Intput Station, The World's First 10 Minute, Self-Serve, Film Development System, (Internet web pages) Jul. 8, 2003.
Applied Science Fiction Announces Digital Dry Film Process Technology, press release, Jul. 9, 2003.
Source Two, Inc., Automate OTUC Processing1 (Advertising sheet) 2003.
Jerry O'Neill, ASF's Assets—Dry Film Developing and Key Software Technologies, International Contact, Jun. 2003.
Digital Finishing—Suppliers Gear Up, Photo Industry Reporter, Sep. 2001.

* cited by examiner

*Primary Examiner*—D. Rutledge

(57) ABSTRACT

Automated unattended film processing kiosk permits a customer to drop off a film unit, e.g., OTUC, and come back later to pick up the finished prints. The customer swipes a credit or debit card through a card reader, and inserts the exposed film unit. Inside the enclosure a mini-lab processor automatically processes the film and extracts images from the film, as negatives or as digital images. A digital printer makes prints of the customer's images. The photographic prints are packaged and labeled, and provided with an optional optical disk. A carousel stores the packaged prints for the customers. At pick-up, the customer swipes a card through for identification. An unload mechanism transfers the customer's finished prints from the carousel to a delivery bin. Print correction for color, density, and contrast can be carried out remotely.

21 Claims, 3 Drawing Sheets

AUTOMATED FILM PROCESSING KIOSK SYSTEM

BACKGROUND OF THE INVENTION

This invention is directed to a photographic film finishing, and is more particularly directed to automated self-service, point-of-sale film processing stations, i.e., automated unattended kiosks, and to a system that permits customers who need film to be processed and printed to be able to obtain processing and prints of their exposed film by depositing the exposed film (either a standard film cassette or a finished one-time use camera (OTUC) into the kiosk, swiping through a credit card or debit card to provide a means of payment for the film processing and also to identify the customer, and whereby the customer can return later to the same kiosk to pick up his or her finished photographic prints, plus an optional CD-ROM containing digital images. At the pickup, the customer can identify himself or herself by swiping a credit or debit card with identifying information through a card reader. The invention is also directed to an entire credit or debit card based point of sale system for selling film or OTUCs, and for processing the customer's exposed film and providing prints within an hour or within some other short time interval. The system may include a photo image correction override feature, wherein, when a customer's photographs are of poor quality in terms of contrast or density (underexposed or overexposed) or outside normal color balance parameters, an operator at the central monitoring station may correct the digital images of the customer's photographs over a wideband communications connection with the processing kiosk.

Distributed, self-service point-of-sale merchandising has proven to be an effective way to sell a product where it is most needed, that is, at the point of consumption. In many cases, this takes place by way of vending machines, which may capitalize on foot traffic and impression-based customer demand. However, for many types of merchandise, and many types of related services, traditional cash-based vending systems have not been entirely effective. For example, film sales and one-time use camera sales through vending machines have shown some promise at vacation and tourist locations, such as theme parks, national historic sites, and the like. On the other hand, because of the sensitivity of the modern color film to temperature variations, the vending machines have to be climate controlled, and the climate control apparatus for the vending machines has to be closely monitored, necessitating a workman making regular daily rounds. At the same time, with a cash based system, there is not much price flexibility, as it is only convenient to sell the OTUCs and 35-mm film cartridges at a fixed, whole-dollar price. In order to provide effective customer service, it is important that the vending machines not run out of cameras or film, and that the machines not run out of change.

Recently, merchants have begun to employ vending systems for selling one-time use cameras using on-line vending technology, and non-cash transaction systems, especially at vacation and tourist locations. The vending machines in this program dispense OTUCs and film, accept credit cards for payment, and remotely monitor and control inventory flows, sales and machine status, including internal temperature. This sort of vending system requires little or no supervision, and eliminated the need for constantly traveling to the machine locations to check on status. Because inventory is monitored on line in real time, there is less need to store inventory on site. Also, the cash-free payment system makes the vending machines a much less attractive target for theft.

On the other hand, there is no corresponding system for on-site film processing, where the customer can drop the film off at a vending machine, order the type of processing desired, and return in a short time (typically one hour or less) and pick up the completed prints of his or her photos. In many busy tourist destinations, such as a theme park, a national park, or other similar busy location, there is no simple way for the tourist or visitor to obtain photographic processing on site, and he or she typically waits until returning home to have the film processed. This means the customer has to wait to actually enjoy the photographs. In addition, with many modern film having extremely high film speeds, e.g., ASA 800 or higher, the films and cameras can be very susceptible to fogging or loss of latent image if the camera is left in the sun or in a vehicle on a sunny day, so there is a risk to waiting, and not processing the film immediately once the film has been exposed.

Many modern automatic or semi-automatic film processing stations exist, e.g., mini-labs, in which the film is placed by a technician at a receptacle location on the machine, and the machine automatically develops the film to produce negatives. These mini-labs typically involve standard C-41 wet-processing chemistry. So-called "dry processing" or digital processing systems also exist, in which the film is only partly processed, and the images are illuminated, e.g., with infrared beams, to extract a digital version of each image. In either case, the next step is to produce prints, which in modem systems involves color ink jet printing of a digital image. Many mini-labs involve so-called optical printing, i.e., using traditional color photographic paper with a color developer and processor technique. While exposure of the photographic prints and color balance can be carried out automatically, there is typically some operator involvement when needed to make additional adjustments. These color mini-labs are what is often used at locations that offer so-called "one hour photo" processing and printing service. The digital dry-process mini-labs can complete a film processing order in a much shorter time, e.g., ten to fifteen minutes. None of these mini-labs have not been set up for unattended operation, with customer drop off and later pick up.

Recently, a digital photoprocessing kiosk has been proposed as free-standing kiosks. These provide film processing while-you-wait, where the customer swipes a credit card in the kiosk's card reader, then places the exposed 35-mm cassette in a film slot. A digital processor module removes the film from the cassette, and commences a develop-and-scan process. The customer waits for about five minutes, and then the first images from the film start to appear on a color screen, with the next photographic images following every seven to ten seconds. A color digital printer dispenses color prints of these images to the customer, and the order is complete in about ten minutes. If there is any problem with image quality, the customer can make adjustments to each image as it appears. The kiosk has the option of outputting an optical disk containing the photo images, and may also send the images by electronic mail to a customer address. Because the process requires the customer to stand in front of the kiosk until the order is completed, the customer must remain for the entire ten minute period and wait to pick up the processing order. If there are two other customers ahead of that customer, then the customer has to spend a half hour at that location to have the film processed. If the customer wants to process two or more rolls of film, then the wait is multiplied by the number of films, i.e., for three rolls of film, the wait would be three times ten minutes, or one-half hour. The customer cannot simply drop off the film and return later to pick up his or her prints. Also, because of the direct process, it is not possible for the customer to retain any sort of traditional color negative.

At high density tourist and recreation locations, such as large theme parks, many customers expose an entire unit of film, i.e., a film roll or cartridge, or the contents of a one-time-use camera, in a single morning, and then have to find a place to store the exposed film until it is convenient to process it. Because the high speed film can suffer image loss or degradation if left in a vehicle in direct sun, or even if left in a pocket of a backpack or handbag, it would be preferable for the user to be able to process the film immediately. However, to date there is no scheme or technique for having film processing kiosks distributed over the geographical extent of a theme park, so that the customer can simply drop the film off, visit one or a few exhibits or rides, and then return to the kiosk to pick up the finished pictures. Moreover, there is no procedure for simply allowing the customer to drop off the exposed film or OTUC, and then giving him or her the option of returning to the kiosk or else having the finished prints mailed to the customer at his or her home.

There is no procedure for tying-in photo processing kiosks so that a customer can be alerted to the correct location to pick up his or her prints, if he or she has dropped the film off at a kiosk at a different location in the system.

There is also no provision to date that allows a customer to drop off film and pick up prints later, where the customer can identify himself or herself simply by swiping a credit card through a reader on the kiosk, so that there is no mistake about the identity of the customer for whom the film and prints were processed.

OBJECTS AND SUMMARY OF THE INVENTION

Accordingly, it is an object of this invention to provide a network based point-of-sale photographic film processing system, in which a customer can simply drop off the unit of film (e.g., 35-mm cartridge or OTUC) at an automated kiosk, insert a credit card (or debit card or equivalent form of identification and payment), and then return later to the kiosk, present an identification, e.g., by swiping a credit or debit card containing customer identification, whereby the equipment within the kiosk will automatically deliver the finished prints (plus negatives and/or digital images on a CD or the like) into a customer delivery bin.

It is another object to provide a photo processing kiosk which incorporates climate control equipment so that quality of the film processing chemistry and quality of the customer's finished print order are ensured.

It is a further object to provide a network for communicating between the equipment within the kiosks and a central monitoring station (or stations), that will permit monitoring the quality of the film processing operation at the various kiosk locations, sufficiency of supplies such as paper and chemicals, and quality of the customer prints.

It is a still further object to provide system in which automated control of print quality such as density, contrast, and color balance, can be over-ridden, if need be, at the central monitoring station to correct the exposure for the customer's prints.

In accordance with an aspect of this invention, an automated film processing kiosk has an enclosure with a film drop-off portion or section at which the customer inserts a film unit, e.g., a film cartridge or OTUC, for automated processing and a prints pick-up portion or section at which the finished prints can be picked up when processing is completed. The enclosure defines an interior, which is favorably climate controlled by means of a HVAC unit. The drop-off portion includes a drop-off customer identification entry arrangement, such as a magnetic stripe card reader, such as a credit-debit card reader and film-unit accepting means that permits the customer to insert the exposed film unit. Inside the enclosure there may be an OTUC camera opener, and/or a film transport for bringing the film cartridge to a mini-lab processor within the interior of said enclosure. The film transport has a queuing means for holding a number of film units so that they may be processed in turn, which means that the customer can simply drop off the film and return later, and not wait until all prior customer orders have been processed. This can index or identify the film with the particular customer, e.g., by attaching a bar code to the film case and/or to the film strip itself. The mini-lab processor automatically processes the film unit, using either a traditional wet process (i.e., C-41) system or a so-called dry process or digital system. The mini-lab processor extracts images from the film unit, either as traditional color of BW negatives, or else as a set of digital images; a printer within the interior of said enclosure which can be a digital printer (i.e., color ink-jet printer) or a traditional optical printer, produces photographic prints of the customer's images based on the images extracted from the customer's film unit. After the printer, a print packaging unit within the interior of the enclosure packages and labels the photographic prints for each customer film unit, and the label can include a bar code that can be scanned to facilitate identifying the package of prints when the customer picks them up. A storage carousel within enclosure contains a plurality of storage chambers for storing the packaged prints for the customer until picked up. The prints pick-up portion of the kiosk enclosure has a pick-up customer identification entry arrangement, which may take the form of a credit/debit card reader, and a delivery bin for presenting the packaged finished prints to the customer. There is a carousel unload mechanism for identifying the chamber of the storage carousel means that holds the customer's packaged finished prints and then transfers the packaged finished prints from that chamber to the delivery bin. A computer control arrangement links the drop-off customer identification arrangement, said pick-up customer identification arrangement, the mini-lab processor, the printer, the storage carousel and carousel unload mechanism, as well as the climate control equipment. The same card swipe mechanism or card reader can be used to serve both the drop off and pick up functionalities. Also, it is possible to use a key entry facility (i.e., key pad) for customer identification on drop off and pick up. A communications module within the enclosure has communication channels connected with the customer drop-off and pick-up credit/debit card reader(s) for permitting automated communication with a credit/debit card issuer to establish the identity of a customer and to communicate customer payment information. The communications module may use wireless or wired broadband communications. The credit card or debit card reader, as may be used with any of various embodiments of this invention, could include a magnetic stripe type card reader, e.g., a card swipe device. Alternatively, the reader can include a bar code reader, smart card reader, RFID reader, cell-phone actuated device, or even a manual means to permit customer entry of card number plus PIN.

In any of several embodiments, the photo processing kiosk includes a digital print maker and a CD recorder (i.e., a "CD Burner") for making a non-volatile digital recording of the images extracted from the respective customer's film. The packaging arrangement associates the CD or other non-volatile recording in the packaging with the finished prints. The drop-off portion of the kiosk can include a CD reader device which permits the customer to insert the non-volatile recording, so the customer can order additional print(s) of one or more of the photos stored digitally on the record medium. The CD reader device is coupled with the computer control. The customer can see the images on a display at the kiosk and can adjust the color and picture quality, as need be, or can crop or enlarge the photographs.

In other possible embodiments, there is a system of multiple kiosks for film/camera automated sales and automated film processing. In this system there is a central monitoring station; at least one film/camera vending kiosk, and at least one automated film processing kiosk. The vending kiosk(s) each contain a supply of one-time use cameras; means for accepting a customer debit or credit card; means for delivering a selected one-time use camera from its supply to the customer; climate control means for maintaining the supply of said one-time use cameras within prescribed range of temperatures; and a communications module for communicating status of the inventory of one-time use cameras and of the climate control means with the central monitoring station. Each automated film processing kiosk has an enclosure with a film drop-off portion, at which the customer inserts said one-time use camera for automated processing, and a prints pick-up portion at which the prints can be picked up when processing is finished (usually in under one hour). The drop-off portion has a drop-off customer identification entry means, which can include a drop-off customer credit or debit card reader, and film-unit accepting means permitting the customer to insert his or her exposed one-time use camera or other film unit. A one-time-use-camera opener extracts the exposed photographic film from the camera. A mini-lab processor within the interior of the kiosk enclosure automatically processes the exposed photographic film and extracts images from it. A print maker (optical or digital) within the enclosure produces photographic prints of the customer's images based on the images extracted from the customer's exposed film. A print packager within the kiosk enclosure packages and labels the photographic prints for each said customer's photographic film. A storage carousel within the enclosure has a number of storage chambers, i.e., slots, for storing the packaged prints for the customer until the customer returns to pick them up. The prints pick-up portion of the kiosk enclosure has a pick-up customer identification entry means, which can include a pick-up customer credit or debit card reader, and a delivery bin that presents the packaged finished prints to the customer. A carousel unload mechanism identifies the chamber of the carousel that holds the customer's packaged finished prints and transfers the packaged finished prints from that chamber to the delivery bin. A computer control mechanism links the drop-off customer identification means, pick-up customer identification means, mini-lab processor; printing means; storage carousel; and carousel unload mechanism. A climate control unit (i.e., a small air-conditioning unit) in the kiosk controls heat and humidity conditions within the enclosure. The climate control unit may be omitted in the case of a dry-process kiosk, especially if it is installed in an indoor area, such as a shopping mall, hotel lobby, or the like. A communications module within the enclosure has communication channels connected with the customer drop-off and pick-up credit or debit card reader(s). This permits automated communication with a credit/debit card issuer (i.e., bank or credit card company) to establish the identity of a customer and to communicate customer payment information. The communications module also communicates the status of the climate control unit and said mini-lab film processor., plus other equipment status, to the central monitoring station.

In these embodiments, a network communicates between the communications modules of the vending kiosks, the film processing kiosks, and the central monitoring station. The central monitoring station automatically alerts personnel to kiosks where resupply may be needed, or where there is a problem with the climate control equipment. In addition, there may be a print quality override station at the central monitoring station that permits an attendant to correct remotely for color or other print quality problems in the event that a customer's prints are outside variations that are normally correctable automatically by the print maker within the kiosk.

According to this invention, a network based multiple automated film processing kiosk system permits customers to obtain prints from exposed photographic film from any of a number of unattended kiosks within some geographic area, i.e, the grounds of an amusement park or theme park, a sports complex, a State Fair fairgrounds, or a National Park, and permits the customer to employ a debit or credit card as a means for payment for processing and printing of images of the film, and also as means for identification of the customer when the customer picks up finished prints. The system has at least one central monitoring station; and a plurality of automated film processing kiosks. At these kiosks the customer can deposit a photographic film unit (e.g., a film cartridge or a one-time use camera) that has been exposed with images, and he or she can later pick up the processed photographic prints of those photographic images. The customer carries this out by presenting an identification and form of payment, e.g., a magnetic stripe credit card or debit card. At each kiosk, the enclosure has a film drop-off portion at which the customer inserts the film unit for automated processing, and a prints pick-up portion at which the prints can be picked up when processing is finished. The drop-off portion has a drop-off customer identification entry means, including drop-off customer credit-debit card reader and film-unit accepting means such as a slot or receptacle, that permits the customer to insert the film unit containing exposed photographic film. A mini-lab processor within the enclosure automatically processes the exposed photographic film and extracts the images from it. A printer or print maker within the enclosure produces photographic prints of the customer's images based on the images extracted from the customer's exposed film. Print packaging means within the kiosk packages and labels the photographic prints for each said customer's photographic film. A storage carousel within the kiosk enclosure has a number of storage chambers for storing the packaged prints for the customers until they are picked up. The prints pick-up portion of the kiosk enclosure has a pick-up customer identification entry means including pick-up customer credit/debit card reader (where convenient, this may be the same credit/debit card reader used for drop-off), and a delivery bin for presenting the packaged finished prints to the customer. A carousel unload mechanism identifies which chamber of the carousel holds the customer's packaged finished prints, and transfers the packaged finished prints from that chamber to the delivery bin. A computer control means links the drop-off customer identification means, the pick-up customer identification means, the mini-lab processor, the printer, the storage carousel, and the carousel unload mechanism. A climate control unit controls heat and humidity conditions within the kiosk enclosure. A communications module has communication channels connected with the customer drop-off and pick-up credit/debit card reader means for permitting automated communication with a credit/debit card issuer to establish the identity of the customer and to communicate customer payment information, and also communicates status of the climate control means, mini-lab film processor, and other equipment to the central monitoring station. A network provides communication between the communications modules of the film processing kiosks and said central monitoring station. The monitoring station can include a print adjustment station having a display at which images from a customer's exposed film at one of the film processing kiosks can be viewed, and a print control adjustment facility for permitting adjustments of contrast, density, and color balance of the customer print. These adjustments are communicated over the network to the kiosk so that the kiosk printer creates corrected prints of the images from the customer's exposed film. To this end, the computer control means within the at least one kiosk includes means for detecting conditions in the images from the exposed film of the customer that are indicative of poor image quality, and automatically communicates the existence of such poor image quality to the print adjustment station of the central monitoring station. The network can employ wireless communications, and may favorably be high-speed broadband.

In a multiple-location retail environment, the network may permit communication between devices on the network, and also between servers at various locations (i.e., a LAN, a WAN, or the Internet).

Because the photo processing system is network based, and the kiosks may be free standing, the theme park or other facility management can set up kiosks anywhere and achieve real-time access to the central monitoring station. That is, the kiosks can be moved quickly to wherever there is customer need.

The kiosk permits management to track inventory and sales remotely, print receipts, look up customers, view database information, view performance, all these functions may be carried out remotely from any location, by linking with the kiosk network.

The above and many other objects, features, and advantages of this invention will become apparent from the ensuing detailed description of a preferred embodiment, which is illustrated in the Accompanying Drawing.

DETAILED DESCRIPTION OF A PREFERRED EMBODIMENT

Figure 1:
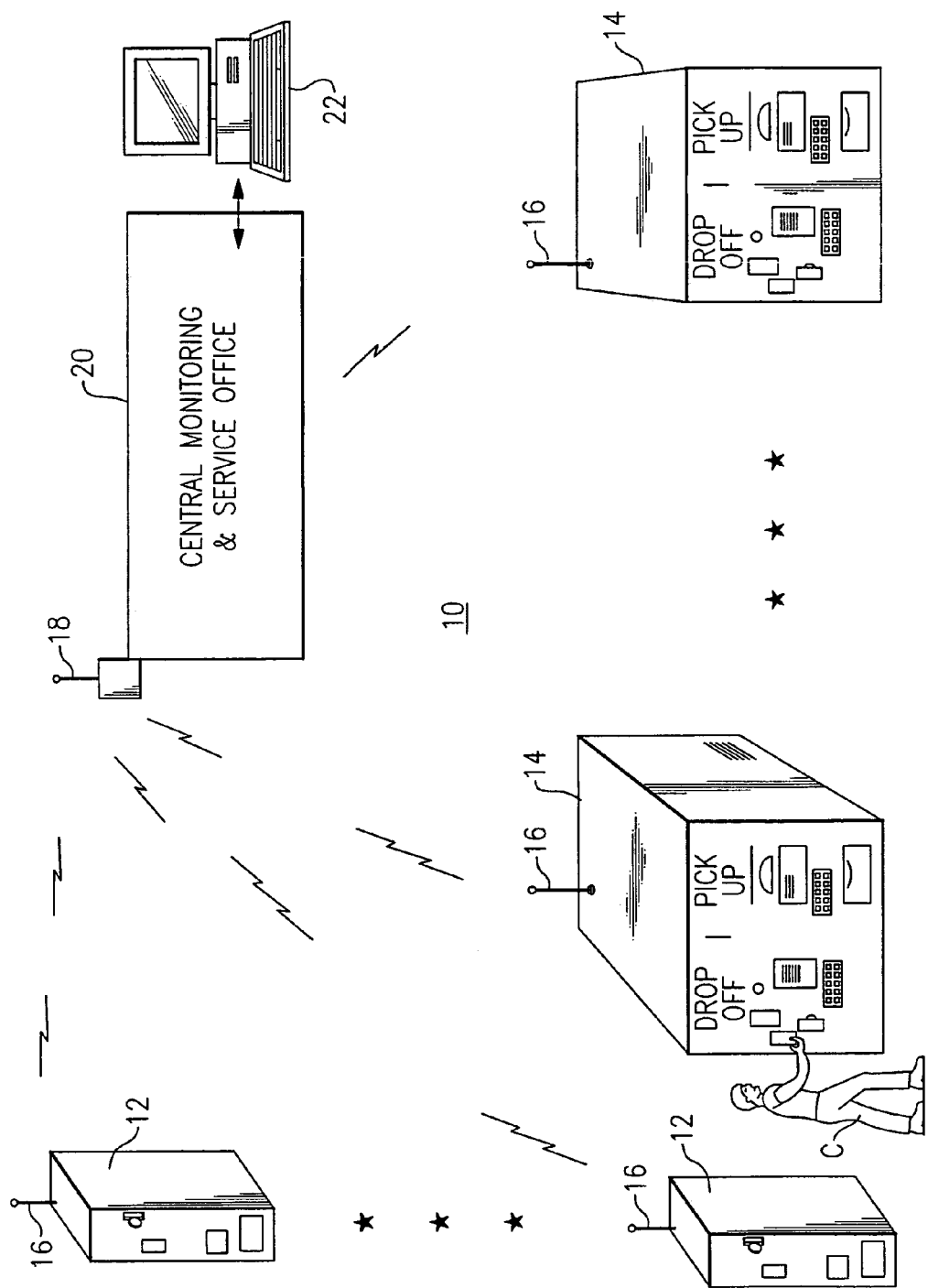
FIG. 1 is a schematic diagram of a multiple kiosk camera and film sales, and photo processing arrangement, with a wireless network and a central monitoring station, according to one preferred embodiment of the present invention.

Now with reference to the Drawing, FIG. 1 represents the overall equipment and connectivity of a photo-film and photo-processing demand point-of-sale system 10 according to an embodiment of the present invention. Here is shown a multiple-kiosk sales and management system 10, in which there are one or more automated film and/or OTUC kiosks 12, 12 located at various places where customers are likely to need film or one time use cameras, such as at a tourist attraction or amusement park. There are also one or more automated film processing kiosks 14, 14 at which a customer C may deposit a roll or cartridge of exposed film for processing, or may insert a one time use camera on which the film has been exposed. This kiosk 14 will accept the film or OTUC, accept a form of identification and form of payment from the customer C, and later have the finished photographic prints of the images on the customer's film available for the customer C to pick up. These kiosks 14 have a rapid process technology in which the customer's print order is completed and ready for pick up in one hour or less, and may be considered a one-hour-photo kiosk or 1HPK. Each of the kiosks 12, 14 has a wireless communications connection 16 on a network that includes a wireless connection 18 which is part of a central monitoring station 20. This station 20 also serves as a customer service office, and also has a computer monitor station 22 at which an attendant can perform management oversight, monitor supply and usage levels at the various kiosks, and can exercise adjustment of the print quality for customer photographic prints, where needed, which is discussed in more detail later.

The system 10 as described here can be well suited for use in a theme park, such as Disney World, or a national park such as Yellowstone or Yosemite, where customers may find many photographic opportunities, and may want to see their photographs before they leave the area. The availability of sales kiosks 12 and automated processing kiosks 14 make it possible for the customer C to obtain film or cameras, and have them processed at, or near, the sites of the various rides or attractions at the park, rather than having to travel some distance to a retail or concession area. The kiosks 12 and 14 can typically be available for customer access twenty-four hours a day, rather than being limited to certain retail store hours. Because the customer identification is established by an automated credit/debit card reading system, the risk of mistake in identifying the customer prints is reduced or eliminated, and it is possible to give the customer additional information about the prints, e.g., a time when the customer's prints will be ready if they are not yet ready.

Figure 2A:
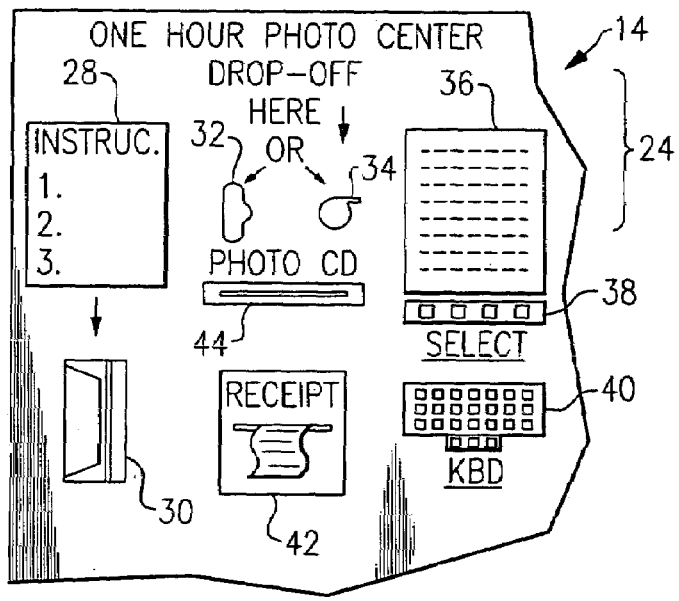
FIG. 2A is a perspective view of a customer drop-off portion of the photo processing kiosk of this embodiment.

The photo-processing kiosk 14 of this embodiment has a film drop-off portion 24, as shown in FIG. 2A, where the customer can drop off his or her film (or OTUC) for automated film processing, and a customer prints pick-up portion 46, as discussed later with reference to FIG. 2B. Here, the film drop-off portion 24 is located on a front side or front panel 26 of the kiosk 14, here located to the left of that panel. The drop-off portion has a chart or panel with a list of instruction 28 printed in English and in other customer languages, such as Spanish, German, Chinese and Japanese, listing the simple procedures for loading the customer's film, making payment, and completing a print order. There is a card swipe reader 30 for reading a customer's magnetic stripe credit card or debit card. This provides both a form of payment for the customer's photo processing order, and also a form of identification, by contacting the credit card issuing company and obtaining the customer's name. This information is useful in identifying the print order for pick up later. The card swipe reader 30 used in this embodiment is an example, and a different form of customer identification and payment could be used, e.g., a bar coded card scanner, or an RFID reader, and it is possible that manual input of customer identification and payment information using customer keystroke input could be used.

The film drop-off portion 24 has an opening 32 for the customer C to insert an OTUC, and another opening for insertion of a 35-mm film cartridge. A screen or display 36 which can be a standard LCD device, shows the customer's identification, i.e., greets him or her by name, and provides prompts for entering such other information as is needed to complete the customer's film processing order. This is done by way of push buttons 38 here positioned below the screen 36. The customer may order certain options, such as double prints, large (4×5) prints, a CD-ROM containing the customer's images contained on the film, or may have the finished prints mailed to his or her home (e.g., as identified from the customer's credit card issuing company). A keyboard or keypad 40 permits the customer to enter additional information, e.g., address or personalizing information if her or she wants the prints mailed to a particular address other than the credit card address, or may be used to enter verification data, i.e., a PIN number or password, or may be used for other reasons. A receipt printer 42 can provide the customer with a printed record of the transaction. The receipt may contain identification data, and optionally a code number to be entered later to identify the prints at pick-up. In this embodiment, a CD-ROM drive 44 is provided to permit the customer C to insert an optical disk containing the customer's photographic images so that the customer can obtain additional prints, or prints that are modified, i.e., enlargements, cropped pictures, color enhanced pictures, prints made on pre-stamped postcard stock, etc. Special prints obtained in this fashion can bypass the photo print storage carousel (described below) for immediate customer pickup.

Figure 2B:
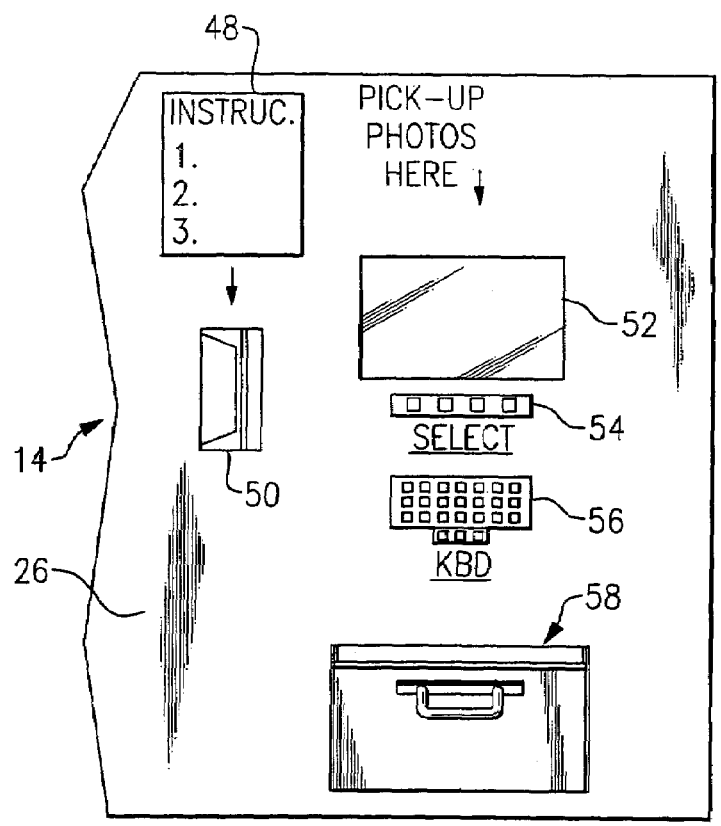
FIG. 2B is a perspective view of a customer pick-up portion of the photo processing kiosk of this embodiment.

The customer photo pick-up portion 46 of the kiosk 14 is illustrated in FIG. 2B, and provides a place where the customer can provide identification and have his or her photos delivered. In this embodiment, the pick-up portion 46 is located on the right-hand side of the front panel 26. A panel containing photo pick-up instructions 48 is provided, as well as a card swipe reader 50. Here the customer credit card is used mainly for identification of the customer using data obtained from the credit card issuer after reading the magnetic stripe on the card, so the customer may use the same card or a different card as used at drop-off. The customer may also be identified by entering a personal code, e.g., a code number that may be printed on the receipt discussed previously. A screen or display 52, which again may be an LCD display, greets the customer by name and provides status of the customer's photo print order. Because there are or may be several kiosks 14 tied into a single network, it is possible for the customer to check on his or her prints at any of the kiosks. In that case, the screen 52 will identify the location of the other kiosk 14 where the customer's prints are located and give the status of that print order.

Selection push buttons 54 are provided directly beneath the display screen 52, and a customer keyboard 56 is also provided. It should be noted that in some cases, the reader 30, screen 36 and keyboard or keypad 40 at the drop-off portion 24 may be shared with the pick-up portion 46, i.e., serve also as the card reader 50, display screen 52 and keyboard 56, in which case each such unit has both a drop-off and pick-up functionality. This would not change the overall concept of the photo processing kiosk 14.

A delivery bin 58 is located at the lower part of the front panel 26, and provides a means for delivering the customer's finished photographs to him or her. When the customer identifies himself or herself, the customer's prints are transferred from a storage carousel within the kiosk to the bin 58, and the bin 58 is unlocked to permit the customer C to open it and remove the customer's finished photos.

Figure 3:
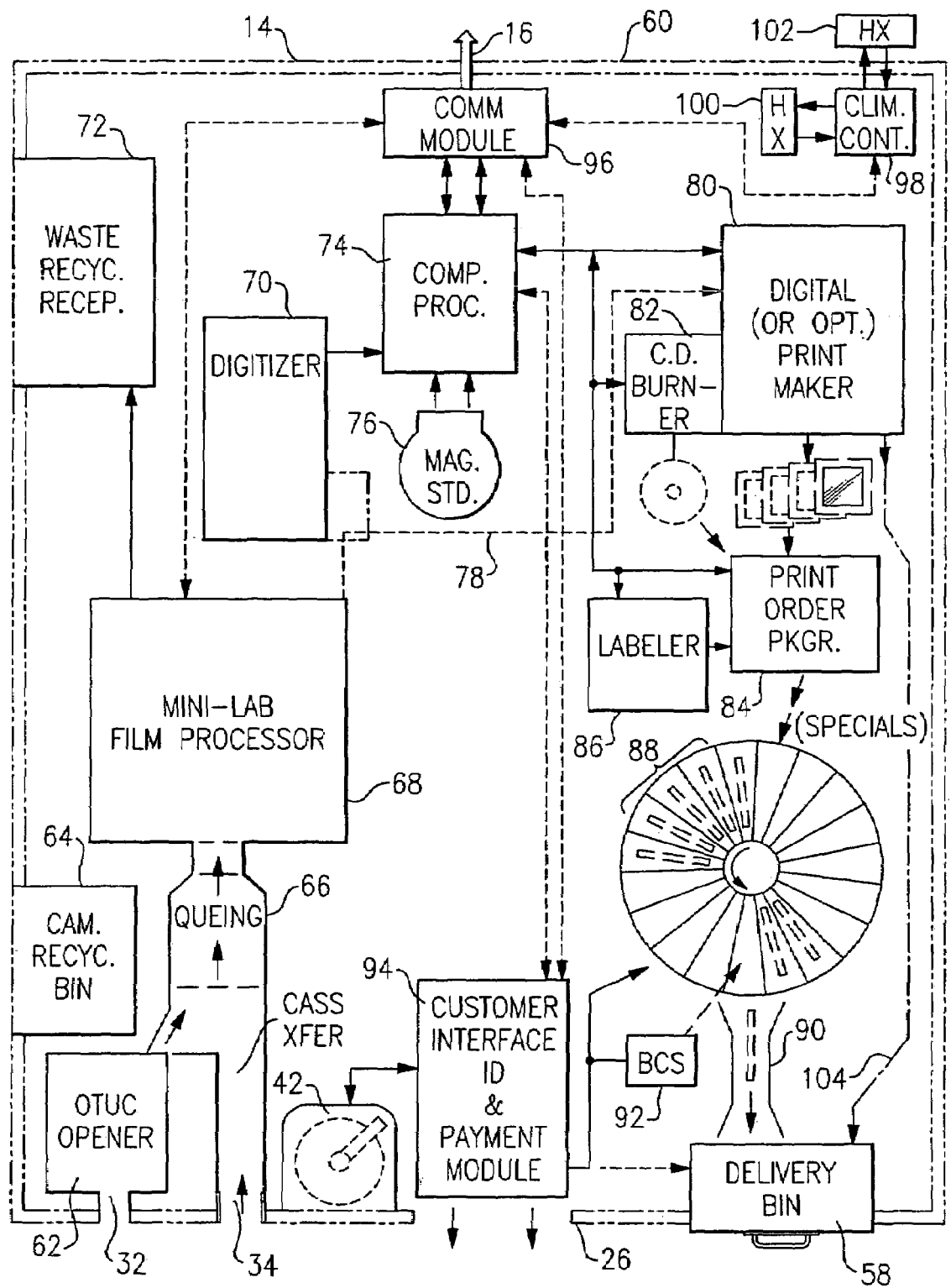
FIG. 3 is a schematic diagram for explaining general internal layout of the photo processing kiosk, and for explaining the operation thereof, in connection with this embodiment.

The general order of the internal workings of the 1HPK kiosk 14 are illustrated schematically in FIG. 3. The kiosk 14 has an outer enclosure or wall 60, which can be of an insulated double-wall construction to provide protection to the film and processing chemistry from temperature extremes, and to help maintain the interior of the kiosk 14 within a narrow temperature range. The enclosure 60 defines a controlled interior of the kiosk.

An automatic camera opener or OTUC opener 62 is located at the OTUC opening 32, and opens the one-time-use-camera inserted by the customer to remove the film cartridge contained inside it. The camera bodies are then transferred to a bin 64 where they can be reused or recycled. A film cartridge transport 66 connects between the film cartridge opening 34 and a film input of an automated mini-lab film processor 68. The transport 66 includes a cueing mechanism, i.e., a linear pathway that holds the film units in sequence until the next stage, i.e., the mini-lab processor, is ready to accept the next film unit. This can use a conventional means for indexing the film to identify it with the customer and film processing order, and may apply a bar code or similar indicia to the film case or to the end of the film strip. A similar film transport links the OTUC opener 62 with the mini-lab processor 68. The queuing mechanism may incorporate a prioritizer, for taking some film units ahead of others (for an increased processing fee). Lower priority processing would be suitable for customers who plan to return later than the usual time for processing (i.e., one hour). The processor accepts the film units, in sequence, from the transport(s) 66, and automatically feeds the film from the associated film cartridge into a system of processing, which may be a more traditional wet-process developing system (based on C-41 chemistry, for example) or may be a so-called dry process or digital direct processor. In either case, the photographic images are produced, either as negative optical images in the wet processor mini lab, or as digital images in the case of the dry process mini lab. A number of both types of mini-lab processors are available and could be used here. A digitizer 70, which can produce digital images from color photographic negatives, may be used to obtain electronic digital images for making digital prints. In the case of a dry process mini lab, the digitizer may be incorporated in the mini-lab equipment. A waste storage tank 72 holds used photographic chemicals and other waste products, so that they may be disposed of without danger to personnel or the environment. A computer processor 74 receives the photographic images from the digitizer 70 and also receives the associated customer and customer print order data, and these images and data are stored on a magnetic storage device 76 which may be a magnetic hard disk drive of sufficient capacity.

An alternative negative film path 78 is shown here if a more traditional optical printing from color negatives is employed, in which case, the negatives are drawn through a portion of the digitizer 70, e.g., to produce a digital CD ROM of the customer's photos.

A printer or print maker 80 may be a digital printer, using color laser printer technology, or may be a traditional optical printer, making paper prints from color photographic paper based on negatives that arrive via the pathway 78. The print maker 80 produces a set of photographic prints of images from the customer's film. At the same time, a CD optical disk writer, or "burner" 82 may be used to produce a CD ROM, i.e., an optically readable disk, containing the digital images of the customer's photographs. A print-order packager 84 consolidates the paper photographic prints, plus CD ROM, if ordered by the customer, and packages them in a suitable sleeve or envelope. A labeler 86 produces and prints a label containing the customer's name and the date, plus a summary of the customer's print order, and places it on the sleeve or envelope. The label may also contain a bar code symbol, or other scannable indicia specifically identifying the customer C.

A storage carousel 88 is situated between the print-order packager 84 and the delivery bin 58, so that it is adjacent to each. The storage carousel is an arrangement of individual receptacles or compartments or chambers where the finished photographic prints may be stored until the customer returns to pick them up. In this embodiment, the carousel is a rotary device, rotating about a vertical axis, but other designs, e.g., an X-Y array, may be used that perform the same basic function. Each compartment of the carousel may carry identifying indicia or may be otherwise indexed, so that it may be easily determined by the computer 74 where each of the sets of finished photographic prints are located for each of the various customers. Here, the carousel rotates to an available compartment to receive the finished print package from the packager 84, and then rotates the respective compartment to a print unloader mechanism 90 when the customer returns to pick up his or her prints. A bar code scanner 92 may be associated with the carousel 88 to identify the customer bar code printed on the labels for the various sets of prints.

The print unloader mechanism 90 removes the packaged prints from the carousel 88 and deposits the package into the delivery bin 58. Then, the kiosk unlocks the bin 58 so the customer may remove his or her prints.

An electronic control board or interface 94 is situated within the interior of the kiosk 14 near the front panel 26. The interface 94 contains a customer ID and payment acceptance module, and also is associated with detectors that are actuated when a film cartridge or an OTUC is placed into the kiosk. There is cabling that connects the interface 94 with the internal computer processor 74 and also connects same with a communications module 96 that is connected with the wireless link or communicator 16. The communications module is also coupled with the mini lab film processor 68, computer processor 74 and other equipment within the kiosk 14 so that equipment status, inventory, and product flow can be monitored at the remote monitoring station 20.

A climate control device 98, i.e., an HVAC unit, is situated within the enclosure 60 of the kiosk 14. In this embodiment, the device 98 is positioned towards the rear and at one corner. There is an internal heat exchanger 100 for controlling the air temperature and humidity within the interior of the kiosk, and an external heat exchanger 102 for exhausting waste heat. Various fans and other air handling and condensate disposal means are not shown here, but would be understood to be present.

The climate control device 98 is also coupled to the communications module 96 so that the internal temperature, humidity, and HVAC equipment status can be monitored remotely.

As mentioned before, if the customer wants to enter a special print order, i.e., from digital images stored on an optical disk, he or she inserts the disk into the drive 42, the kiosk's print maker creates various custom prints, and these are delivered directly to the bin 58. For this purpose, a special transport 104 may be provided from the printmaker 80 to the bin 58, bypassing the carousel 88 and carousel unload mechanism 90. In some embodiments, a receptacle (not shown here) can be provided on the kiosk 14 to accept a memory card of a digital camera, so that a customer can make prints on the spot from his or her digital pictures. This may be useful in making custom prints on post card stock to mail to friends and family.

The printmaker 80 in normal operation will automatically correct for imperfections in the customer's film images; that is, the printmaker can make adjustments automatically to compensate for detected overexposure, underexposure, or color imbalance within some moderate range. However, in the event that the customer images are detected to be outside the normal range of variation, i.e., too dense, too thin or faint, or too far overbalanced for color, an automatic alert is sent via the communications module 96 to the central monitoring station 20. At that point an attendant situated at the computer monitor or console 22 will be alerted to this problem. The attendant can view the customer's images as they exist at the kiosk 14, and can make suitable adjustments in color balance, exposure, density, or the like to improve the images to an acceptable quality. With a broadband connection between the central monitoring station and the various photo processing kiosks the images can be uploaded very quickly for this manual correction, and then can be downloaded back to the kiosk for printing. That is, in this technique, the attendant or other operator may remotely override the automatic print exposure and color control at the kiosk, if needed or if requested. The manual image correction may be an option, for which an extra fee is charged to the customer, or may be specially requested by the customer.

Because all the photo processing kiosks 14 of a given system are interconnected on a communications network, it is possible in some embodiments for a customer to drop off film (or OTUC camera) at a kiosk 14 at one location, and pick up the finished prints (digitally reproduced) at another kiosk at a different location. The customer may also check on the status of a print order at any kiosk 14, and the display 52 will provide status information plus the location of the kiosk 14 that holds the customer's film order or prints. If desired, the customer may have his or her digital photographs sent electronically, i.e., as attachments to an e-mail message, to his or her home or to family or friends. The e-mail addresses may be entered using the keyboard 40 or 56. The charge for this service may be added to the customer's credit or debit card account.

In some possible embodiments, customer access may be achieved over the Internet from a customer location, i.e., home or office, using a customer computer or other web-enabled device, which may be a web-enabled cell phone or personal digital assistant (PDA). A Web address may be printed on the customer receipt. This arrangement permits the customer to query the system, i.e., as to print order status, or other desired information. The system may send the customer reminders about completed film processing, via e-mail or automated phone (voice or data) communications to the customer's cell phone.

The central monitoring station 20, which may be located on premises or off site, permits management personnel to monitor sales activity and obtain management reports from the various kiosks 12, 14.

While the kiosks 12, 14 as shown here are actuated using credit or debit cards, and are intended to be cashless, it is possible to incorporate a bill acceptor and coin acceptor to permit customer self-service operation based on cash. A cash deposit of this type may be used to issue a pre-paid debit card automatically.

In case a customer needs a receipt, but has lost the receipt, the customer can log on to the system web site and re-print the receipt.

While the invention has been described with reference to a preferred embodiment and various alternatives thereto, it should be apparent that the invention is not restricted to such embodiment(s). Rather, many variations would be apparent to persons of skill in the art without departing from the scope and spirit of this invention, as defined in the appended claims.

I claim:

1. An unattended automated film processing kiosk at which a customer can deposit a photographic film unit exposed with images and can later pick up finished processed photographic prints of said images by presenting an identification and form of payment, with the film processing and printing taking place without requiring presence of the customer; said kiosk comprising an enclosure having a film drop-off portion at which the customer inserts said film unit for automated processing and a prints pick-up portion at which the finished prints can be picked up when processing thereof is completed; said enclosure defining an interior; said drop-off portion including drop-off customer identification entry means and film-unit accepting means permitting the customer to insert said exposed film unit; mini-lab processing means within the interior of said enclosure for automatically processing said film unit and extracting images from said film unit; printing means within the interior of said enclosure for producing photographic prints of the customer's images based on the images extracted from the customer's film unit; print packaging means within the interior of said enclosure for automatically packaging and labeling the photographic prints for each said customer film unit; storage carousel means within said enclosure and having a plurality of storage chambers for storing the packaged prints for the customer until picked up; said prints pick-up portion of said kiosk enclosure having a pick-up customer identification entry means and a delivery bin for presenting the packaged finished prints to the customer; the kiosk also comprising a carousel unload mechanism for identifying the chamber of the storage carousel means which holds the customer's packaged finished prints and for automatically transferring said packaged finished prints from such chamber to the delivery bin; and computer control means linking said drop-off customer identification means, said pick-up customer identification means, said mini-lab processing means, said printing means, said storage carousel means; and said carousel unload mechanism.

2. Automated film processing kiosk according to according to claim 1 wherein said printer means includes a bar code labeler for printing a customer-specific bar code, and said unload mechanism includes a bar code scanner for identifying the packaged prints of a customer among the chambers of said storage carousel means.

3. Automated film processing kiosk according to claim 1 wherein said storage carousel means includes a rotary arrangement of said chambers that rotate controllably in a space within said enclosure adjacent both said printer means and said delivery bin.

4. Automated film processing kiosk according to claim 1 further comprising climate control means for controlling heat and humidity conditions within said enclosure.

5. Automated film processing kiosk according to claim 1 wherein said drop-off customer identification entry means and said pick-up customer identification entry means each respectively include a customer credit/debit card reader means.

6. Automated film processing kiosk according to claim 5 comprising a communications module within said enclosure and having communication channels connected with said customer drop-off and pick-up credit/debit card reader means for permitting automated communication with a credit/debit card issuer to establish the identity of a customer and to communicate customer payment information.

7. Automated film processing kiosk according to claim 6 wherein said mini-lab processing means is coupled to said communications module for automatically transmitting operability status of the processing means.

8. Automated film processing kiosk according to claim 7 further comprising climate control means for controlling heat and humidity conditions within said enclosure, and wherein said climate control means is coupled to said communications module for automatically transmitting operability status of the climate control means.

9. Automated film processing kiosk according to claim 1 wherein said printer means further includes a digital print maker, and a CD recorder for making a non-volatile digital recording of the images extracted from a respective customer film unit, and said packaging means includes means for packaging the non-volatile recording with the associated finished prints.

10. Automated film processing kiosk according to claim 9 wherein said film-unit accepting means includes automatic queuing means for holding a number of film units so that they may be processed in turn.

11. A multiple film/camera automated sales and automated film processing kiosk system comprising
a central monitoring station;
at least one film/camera vending kiosk, said vending kiosk containing a supply of one-time use cameras; means for accepting a customer non-cash payment; means for delivering a selected one-time use camera from said supply to the customer; climate control means for maintaining the supply of said one-time use cameras within prescribed range of temperatures; and a communications module for communicating status of said supply of one-time use cameras and said climate control means with said central monitoring station;
at least one automated unattended film processing kiosk at which the customer can deposit a one-time use camera exposed with images and can later pick up processed photographic prints of said images by presenting an identification and form of payment, in which the processing and printing do not require the presence of the customer; said kiosk being located remote from said central monitoring station; said kiosk comprising an enclosure having a film drop-off portion at which the customer inserts said one-time use camera for automated processing and a prints pick-up portion at which the prints can be picked up when processing thereof is finished; said enclosure defining an interior; said drop-off portion including drop-off customer identification entry and payment means and film-unit accepting means permitting the customer to insert said exposed one-time use camera; an one-time-use-camera opener for automatically extracting exposed photographic film from said camera; mini-lab processing means within the interior of said enclosure for automatically processing said exposed photographic film and extracting images therefrom; printing means within the interior of said enclosure for producing photographic prints of the customer's images based on the images extracted from the customer's exposed film; print packaging means within the interior of said enclosure for packaging and labeling the photographic prints for each said customer's photographic film; storage carousel means within said enclosure and having a plurality of storage chambers for storing the packaged prints for the customer until picked up; said prints pick-up portion of said kiosk enclosure having a pick-up customer identification entry means and a delivery bin for presenting the packaged finished prints to the customer; the kiosk also comprising a carousel unload mechanism for identifying the chamber of the carousel means which holds the customer's packaged finished prints and for transferring said packaged finished prints from such chamber to the delivery bin; and computer control means linking said drop-off customer identification means, said pick-up customer identification means, said mini-lab processing means, said printing means, said storage carousel means, and said carousel unload mechanism; climate control means for controlling heat and humidity conditions within said enclosure; and a communications module within said enclosure and having communication channels connected with said drop-off and pick-up customer identification means, to establish the identity of a customer and to communicate customer payment information, and communicating the status of said climate control means and said mini-lab film processing means; and a communications network permitting communication between the communications modules of said vending kiosks, said film processing kiosks, and said central monitoring station.

12. Multiple kiosk system according to claim 11 wherein said central monitoring station includes a print adjustment station having a display at which images from a customer's exposed film at one of said at least one film processing kiosk can be viewed, and print control adjustment means for permitting adjustments of contrast, density, and color balance of the customer print; and communicating said adjustments over said network to said at least one kiosk so that the printing means thereof creates corrected prints of the images from the customer's exposed film.

13. Multiple kiosk system according to claim 12 wherein the computer control means includes means for detecting conditions in the images from the exposed film of the customer that are indicative of poor image quality, and automatically communicating the existence of such poor image quality to said print adjustment station of the central monitoring station.

14. Multiple kiosk system according to claim 11 wherein said network includes means for communicating wirelessly with each of said kiosks.

15. Multiple kiosk system according to claim 11 wherein said network means includes a broadband communications channel connecting to each of said film processing kiosks.

16. Multiple kiosk system according to claim 11 wherein said drop-off customer identification entry means and said pick-up customer identification entry means respectively include a customer credit/debit card reader means.

17. Network based multiple automated film processing kiosk system permitting customers to obtain prints from exposed photographic film from any of a plurality of unattended kiosks within a geographic area, and to employ a debit or credit card as a means for payment for processing and printing of images of the film, and also as means for identification of the customer when the customer picks up finished prints; comprising a central monitoring station;

a plurality of automated and unattended film processing kiosks, at which the customer can deposit a photographic film unit exposed with images and can later pick up processed photographic prints of said images by presenting an identification and form of payment, in which the processing and printing do not require the presence of the customer; each said kiosk comprising an enclosure having a film drop-off portion at which the customer inserts said film unit for automated processing and a prints pick-up portion at which the prints can be picked up when processing thereof is finished; said enclosure defining an interior; said drop-off portion including drop-off customer identification entry means, including drop-off customer credit-debit card reader and film-unit accepting means permitting the customer to insert said film unit containing exposed photographic film containing the customer's photographic images; mini-lab processing means within the interior of said enclosure for automatically processing said exposed photographic film and extracting the images therefrom; printing means within the interior of said enclosure for producing photographic prints of the customer's images based on the images extracted from the customer's exposed film; print packaging means within the interior of said enclosure for packaging and labeling the photographic prints for each said customer's photographic film; storage carousel means within said enclosure and having a plurality of storage chambers for storing the packaged prints for the customer until picked up; said prints pick-up portion of said kiosk enclosure having a pick-up customer identification entry means, including pick-up customer credit/debit card reader and a delivery bin for presenting the packaged finished prints to the customer; the kiosk also comprising a carousel unload mechanism for identifying the chamber of the carousel means which holds the customer's packaged finished prints and for transferring said packaged finished prints from such chamber to the delivery bin; and computer control means linking said drop-off customer identification means, said pick-up customer identification means, said mini-lab processing means, said printing means, said storage carousel means; and said carousel unload mechanism; climate control means for controlling heat and humidity conditions within said enclosure; and a communications module within said enclosure and having communication channels connected with said customer drop-off and pick-up credit/debit card reader means for permitting automated communication with a credit/debit card issuer to establish the identity of a customer and to communicate customer payment information, and communicating the status of said climate control means and said minilab film processing means; and a network permitting communication between the communications modules of said film processing kiosks and said central monitoring station.

18. Multiple kiosk system according to claim 17 wherein said monitoring station includes a print adjustment station having a display at which images from a customer's exposed film at one of said film processing kiosks can be viewed, and print control adjustment means for permitting remote adjustments of contrast, density, and color balance of the customer print; and communicating said adjustments over said network to said at least one kiosk so that the printing means thereof creates corrected prints of the images from the customer's exposed film.

19. Multiple kiosk system according to claim 18 wherein the computer control means includes means for detecting conditions in the images from the exposed film of the customer that are indicative of poor image quality, and automatically communicating the existence of such poor image quality to said print adjustment station of the central monitoring station.

20. Multiple kiosk system according to claim 17 wherein said network includes means for communicating wirelessly between said central monitoring station and said kiosks.

21. Multiple kiosk system according to claim 17 wherein said network means includes a broadband communications channel connecting said central monitoring station to said film processing kiosks.

* * * * *